US006156234A

United States Patent [19]

Briscoe et al.

[11] Patent Number: 6,156,234

[45] Date of Patent: Dec. 5, 2000

[54] PROCESS FOR SUPPLYING A GASEOUS MIXTURE TO AN AUTOTHERMAL REACTOR

[75] Inventors: Michael D. Briscoe, McKinney; Kernan J. McHugh, Allen, both of Tex.; John R. Wolflick, Chatsworth, Calif.

[73] Assignee: Atlantic Richfield Company, Chicago, Ill.

[21] Appl. No.: 09/405,431

[22] Filed: Sep. 23, 1999

[51] Int. Cl.[7] .............................. C07C 1/02; C07C 27/00

[52] U.S. Cl. ........................... 252/373; 518/702; 518/703

[58] Field of Search ............................ 252/373; 518/702, 518/703

[56] References Cited

U.S. PATENT DOCUMENTS 5,023,276 6/1991 Yarrington et al. ..................... 514/703

OTHER PUBLICATIONS

Hensen et al, High Pressure Autothermal Reforming, Stud. Surf. Sci. Catal. (1998), 119, 875–882, 1998.

Jess et al, Production of synthesis gas by catalytic partial oxidation of metane with air, Oil Gas—European Magazine, Mar. 1994.

"GT: GT24/GT26 Gas Turbines" brochure; ABB Power Generation Inc., Midlothian Virginia, U.S.A. Aug. 1999.

*Primary Examiner*—Samuel Barts
*Assistant Examiner*—J. Parsa
*Attorney, Agent, or Firm*—F. Lindsey Scott; Thomas A. Yassen; Robert E. Sloat

[57] ABSTRACT

An improved process for the compression and heating of air or oxygen-enriched air for charging to an autothermal reactor by using a single high compression ratio compressor to produce a high-pressure, high-temperature air or oxygen-enriched air stream for mixture with a hydrocarbon gas stream to produce a charge stream to an autothermal reactor at an elevated pressure above about 350 psig and at an elevated temperature from about 700 to about 900° F.

7 Claims, 1 Drawing Sheet

PROCESS FOR SUPPLYING A GASEOUS MIXTURE TO AN AUTOTHERMAL REACTOR

FIELD OF THE INVENTION

The present invention relates to an improved process for the compression and heating of air or oxygen-enriched air and light hydrocarbon gas charged to an autothermal reactor, a partial oxidation reactor or the like.

BACKGROUND OF THE INVENTION

Autothermal reactors (ATR), partial oxidation reactors and the like are commonly used to produce synthesis gas from light hydrocarbon gases by substoichiometric oxidation with air or oxygen-enriched air. The light hydrocarbon gas and the air or oxygen-enriched air are blended in a proper ratio at a pressure from about 200 to about 500 psig and a temperature from about 700 to 900° F. and substoichiometrically combusted in the ATR to produce synthesis gas having a desired hydrogen to carbon monoxide ratio. Varying amounts of steam can be added to the mixture as desired to vary the hydrogen:carbon monoxide ratio for the production of paraffins, methanol, olefins or the like in a Fischer-Tropsch reactor, for process control or the like. Typically when heavy paraffins are to be produced in the Fischer-Tropsch reaction, the synthesis gas ratio for hydrogen to carbon monoxide is from about 1.5 to about 2.5. Frequently steam is added to the mixture in an amount sufficient to control soot formation when a flame is used. The practice of such technology is considered to be well known to those skilled in the art. The compression and heating of the air or oxygen-enriched air and light hydrocarbon gas is a major expense in the overall process.

Typically the substoichiometric combustion gas product produced at a flame-producing nozzle is passed into a synthesis gas reforming catalyst bed which is typically nickel on alumina or the like to reform the synthesis gas to an equilibrium composition. Alternatively the gaseous mixture may be passed flamelessly into the catalyst bed for reaction on the catalyst to produce an equilibrium mixture of synthesis gas.

The light hydrocarbon gas is typically available from a gas pipeline, subterranean formation or the like at a relatively high pressure typically at least 400 pounds per square inch gauge (psig). In most processes this gas is de-sulfurized and passed directly to the autothermal reactor after heating to a desired temperature which is typically from about 700 to about 900° F. The heating is normally done in a heat exchanger or a fired heater.

The air or oxygen-enriched air (hereafter referred to as air) is typically available at ambient temperature and pressure and is passed to a series of compressors to increase the pressure to about 400 psig. A limiting factor is the increase in air temperature as the air is compressed. Typically the seals in such compressors will withstand temperatures of up to about 400° F. to about 450° F. This equates to single stage of compression ratios of less than about 3.5:1 for each stage. Accordingly in order to achieve the desired pressure up to about 500 psig, it typically takes three stages of compression with intercooling. These compressors may be separate units or they may be formed as a multi-stage axial compressor. In either case it is necessary to use an intercooler, such as an air fan or a water cooler, between stages to reduce the temperature of the compressed air before compression in the next stage. The last stage does not require a cooler since this stream is passed directly to the autothermal reactor, typically via a fired heater or other heat exchanger to raise the temperature of the compressed air to from about 700 to about 900° F. so that the temperature of the compressed air and the light hydrocarbon gas stream are approximately the same.

Since this process typically requires a three-stage compression system and since it requires intercooling which results in the loss of substantial heat which must subsequently be replaced by the use of a fired heater or other heat exchanger, the process contains inefficiencies. These inefficiencies can result in substantial expense. It would be highly desirable if a more economical method was available for the compression and heating of the air supplied to the autothermal reactor.

Accordingly a continuing search has been directed to the development of a more efficient method for compressing and heating the air stream required in the autothermal reactor.

SUMMARY OF THE INVENTION

According to the present invention a gaseous mixture of a light hydrocarbon gas and a substoichiometric amount of an oxygen-containing gas comprising air or oxygen-enriched air in an amount sufficient to produce synthesis gas having a hydrogen to carbon monoxide ratio from about 1.0 to about 5.0 is more economically supplied to an autothermal reactor at a pressure greater than about 350 psig and a temperature from about 700 to about 900° F. by a process comprising; compressing an oxygen-containing gas stream comprising air or oxygen-enriched air to a pressure of at least about 350 psig in a single stage of compression having a compression ratio of at least 25:1 to produce a compressed oxygen-containing gas stream at a pressure greater than about 350 psig and at a temperature of at least about 1000° F.; passing a light hydrocarbon gas stream at a pressure greater than about 350 psig and at a temperature from about 60 to about 750° F. to the autothermal reactor; passing the compressed oxygen-containing gas stream to the autothermal reactor; and, mixing a quantity of the compressed oxygen-containing gas stream sufficient for substoichiometric oxidation of the light hydrocarbon gas stream to produce a synthesis gas stream having a hydrogen to carbon monoxide ratio from about 1.0 to about 5.0, with the light hydrocarbon gas stream to produce a gaseous mixture of the light hydrocarbon gas and the oxygen-containing gas at a pressure greater than about 350 psig and at a temperature from about 700 to about 900° F.

DESCRIPTION OF THE PREFERRED EMBODIMENTS

In the description of the Figures the same numbers will be used throughout to refer to the same or similar components.

Figure 1:
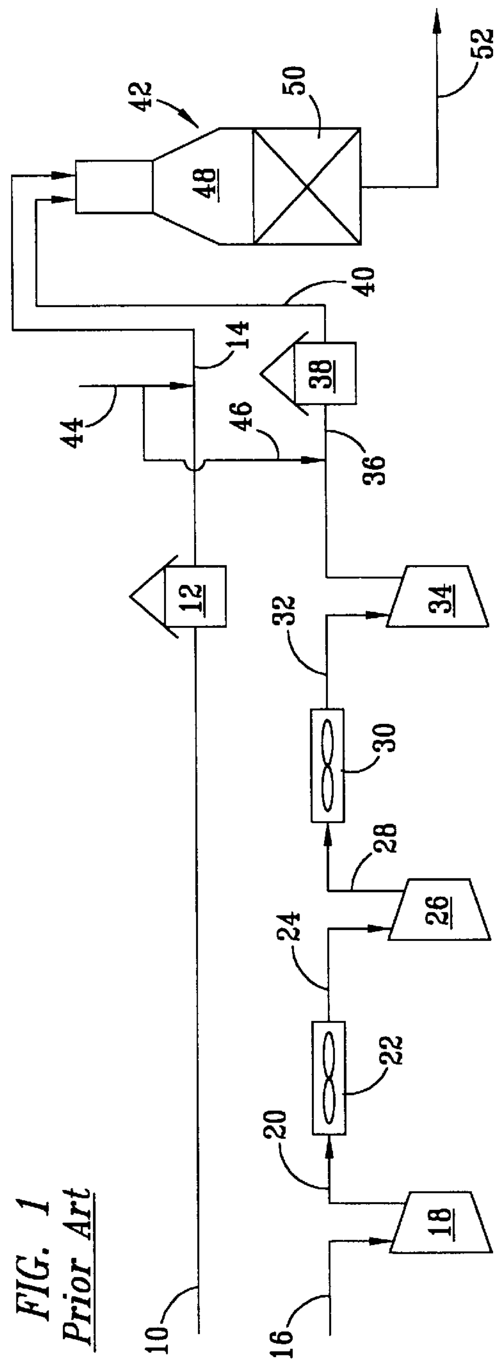
FIG. 1 is a schematic diagram of an embodiment of a prior art process for supplying a gaseous mixture of a light hydrocarbon gas and air to an autothermal reactor at a pressure greater than about 350 psig and at a temperature from about 700 to about 900° F.; and, FIG. 2 is a schematic diagram of a process for supplying a gaseous mixture of a light hydrocarbon gas and air to an autothermal reactor according to the present invention.

In FIG. 1 a prior art method for supplying a mixture of a light hydrocarbon gas and air to a autothermal reactor is shown. A light hydrocarbon gas, such as desulfurized natural gas, is supplied through a line 10 and is typically available from a pipeline or a producing formation at a pressure of at least 400 psig at a temperature which is typically from about 60 to about 750° F. The natural gas is heated in a heater 12 to a temperature from about 700 to about 900° F. and passed via a line 14 to an autothermal reactor 42.

Air (typically ambient air) supplied through a line 16 is passed to a first stage of compression 18 where it is compressed to a pressure less than about 150 psig at a temperature less than about 400° F. The compressed hot air is recovered through a line 20 and passed to a fan cooler 22 where it is cooled to a temperature which is typically less than 120° F. The compressed cooled air is then passed through a line 24 to a second stage of compression 26 where it is further compressed to a pressure less than about 300 psig with an increase in the temperature to less than about 400° F. The hot compressed air is recovered via a line 28 and passed through a fan cooler 30 where it is cooled to a temperature less than 120° F., recovered through a line 32 and passed to a third stage of compression 34. In third stage compressor 34 the compressed air is further compressed to a pressure of about 400 psig at a temperature below about 400° F. and passed through a line 36 to a heater 38 where it is heated to a temperature from about 700 to about 900° F. and passed via a line 40 to autothermal reactor 42. Water or steam may be added to either or both of lines 14 and 36 through lines 44 and 46 respectively. Typically the water or steam is added in an amount sufficient to control soot formation in autothermal reactor 42 if a flame combustion process is used. The steam may be somewhat less and may be up to from about 0.25 to about 1.6 times the volume of the light hydrocarbon gas stream when a flameless oxidation process is used. In any event the light hydrocarbon gas and the air are intimately mixed and the hydrocarbon gas is substoichiometrically oxidized in autothermal reactor 42 to produce synthesis gas. Autothermal reactor 42, as known to the art, may comprise an oxidation zone 48 if a flame oxidation process is used and a reforming zone 50 which contains a catalyst, which is typically nickel on alumina, where the synthesis gas is reacted to equilibrium conditions or the hydrocarbon gas may be reacted in the catalyst bed. The synthesis gas is then recovered though a line 52. The amount of steam added may vary depending upon the hydrogen to carbon monoxide ratio desired in the synthesis gas. In other words different ratios are desired dependent upon whether the synthesis gas is to be used to produce olefins, methanol, heavy liquid paraffins or the like. Such variations in the operation of the ATR are considered to be well known to those skilled in the Fischer-Tropsch art and do not constitute a part of the present invention.

Upon review of the prior art process it will be noted that approximately two-thirds of the total heat generated in the compression process is lost to cooling in coolers 22 and 30 which typically remove the heat to the atmosphere. This heat is effectively lost to the process. It is also noted that both the light hydrocarbon gas in line 10 and the compressed air in line 36 require a separate fired heating step or other heat exchange step to heat the light hydrocarbon gas and the compressed air to a suitable temperature for charging to autothermal reactor 42.

Figure 2:
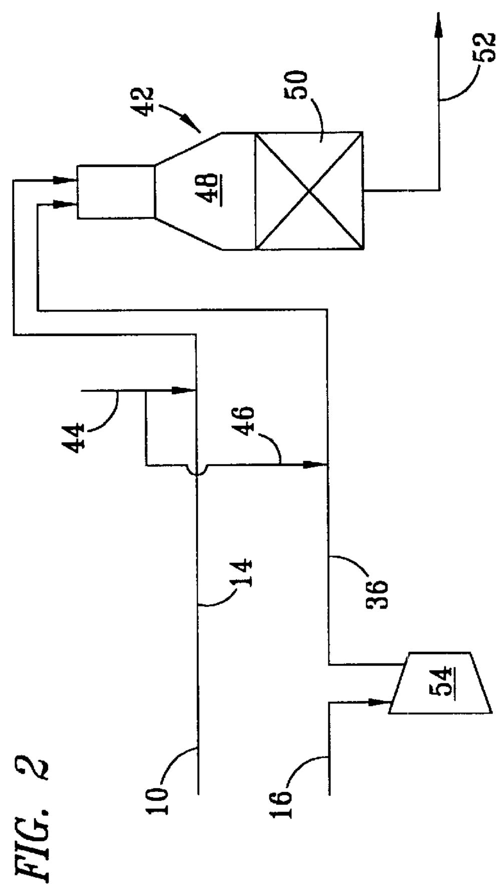

In FIG. 2 an embodiment of the present invention is shown. The natural gas is supplied through line 10 as desulfurized natural gas at about 400 psig, as shown in FIG. 1. However no additional heating is necessary for the light hydrocarbon gas stream in line 14 which is typically at a temperature of about 60 to about 750° F. This stream is mixed with a hot compressed air stream in this embodiment. The air is supplied through line 16 and is passed to a single stage compressor 54. This compressor is a compressor having a single stage of compression ratio of at least 25:1. Such compressors have been developed for use as a part of turbine engines in the electrical generation industry and can operate at temperatures above 1000° F. One such compressor as a part of a turbine engine, is manufactured by ABB Power Generation, Inc. 5309 Commonwealth Centre Parkway, Midlothian, Va. 23112 as their GT24/GT26 gas turbines.

By the use of a single-stage of compression as shown in FIG. 2 it should be noted that none of the heat is removed. The heat is recovered with the compressed air stream in line 36. This heated air stream when passed through line 36 to autothermal reactor 42 is at a temperature of at least about 1000° F. Mixture of this stream with the light hydrocarbon gas stream results in heating the combined streams to the desired temperature from about 700 to about 900° F. Water or steam may be added to either or both of lines 14 and 36. This eliminates the need for a fired heater or other heat exchange system for the de-sulfurized light hydrocarbon gas stream and for the compressed air stream. Accordingly there is a substantial cost saving in the heating energy required to operate the process while operating the process at substantially the same temperature and pressure conditions. As discussed previously in conjunction with FIG. 1, the light hydrocarbon stream and the air stream are mixed in autothermal reactor 42 to produce the desired mixture of light hydrocarbon gas and air for substoichiometric oxidation to produce the desired synthesis gas mixture.

While the single-stage of compression desirably has a compression ratio of at least 25:1, it is preferred that the compression ratio be up to about 30:1.

As noted previously the hydrogen to carbon monoxide ratio in the synthesis gas can vary widely. Ratios from about 1:1 to about 5:1 are commonly used for production of various products in the Fischer-Tropsch reaction. Preferably the gas ratio is from about 1:1 to about 3:1 when it is desired to produce liquid paraffinic hydrocarbons.

The term "air" with respect to the oxidant gas charged to the autothermal reactor refers to air or oxygen-enriched air.

Having thus described the present invention by reference to certain of its preferred embodiments, it is respectfully pointed out that the embodiments described are illustrative rather than limiting in nature and that many variations and modifications are possible within the scope of the present invention.

We claim:

1. A process for supplying a gaseous mixture of a light hydrocarbon gas and a substoichiometric amount of an oxygen-containing gas comprising air or oxygen-enriched air in an amount sufficient to produce a synthesis gas having a hydrogen to carbon monoxide ratio from about 1:1 to about 5:1 to an autothermal reactor at a pressure greater than about 350 psig and a temperature from about 700 to about 900° F., the process consisting essentially of:

a) compressing an oxygen-containing gas stream consisting essentially of air or oxygen-enriched air to a pressure of at least about 350 psig in a single stage of compression having a compression ratio of at least 25:1 to produce a compressed oxygen-containing gas stream at a pressure greater than about 350 psig and at a temperature of at least about 1000° F.;

b) mixing a light hydrocarbon gas stream at a pressure of at least about 350 psig and at a temperature from about 60 to about 750° F. with a quantity of the compressed oxygen-containing gas stream sufficient for substoichiometric oxidation of the light hydrocarbon gas stream to produce a synthesis gas stream having a hydrogen to carbon monoxide ratio from about 1.0 to about 4.0 with the light hydrocarbon gas stream to produce a gaseous mixture at a pressure greater than about 350 psig and at a temperature from about 700 to about 900° F.; and c) charging the gaseous mixture to the autothermal reactor.

2. The process of claim 1 wherein the light hydrocarbon gas is a desulfurized natural gas stream.

3. The process of claim 1 wherein the gaseous mixture is at a pressure greater than about 375 psig.

4. The process of claim 1 wherein water or steam is added to the gaseous mixture with at least one of the light hydrocarbon gas stream and the oxygen-containing gas stream.

5. The process of claim 1 wherein the water is added in an amount equal to from about 0.25 to about 1.6 times the volume of the light hydrocarbon gas stream.

6. The process of claim 1 wherein the compression ratio of the compressor is at least about 30:1.

7. The process of claim 1 wherein the hydrogen to carbon monoxide ratio of the synthesis gas is from about 1:1 to about 3:1.

* * * * *